United States Patent
Lee

(10) Patent No.: US 12,194,990 B2
(45) Date of Patent: Jan. 14, 2025

(54) APPARATUS AND METHOD FOR CONTROLLING BRAKE SYSTEM BASED ON DRIVER'S FORWARD GAZE

(71) Applicant: HYUNDAI MOBIS Co., Ltd., Seoul (KR)

(72) Inventor: Jun Yung Lee, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 260 days.

(21) Appl. No.: 17/870,247

(22) Filed: Jul. 21, 2022

(65) Prior Publication Data
US 2023/0039995 A1    Feb. 9, 2023

(30) Foreign Application Priority Data
Aug. 4, 2021    (KR) .................... 10-2021-0102317

(51) Int. Cl.
| B60W 30/09 | (2012.01) |
| B60W 10/18 | (2012.01) |
| B60W 30/095 | (2012.01) |
| B60W 40/08 | (2012.01) |
| B60W 50/14 | (2020.01) |

(52) U.S. Cl.
CPC ............ B60W 30/09 (2013.01); B60W 10/18 (2013.01); B60W 30/0956 (2013.01); B60W 40/08 (2013.01); B60W 50/14 (2013.01); *B60W 2540/225* (2020.02); *B60W 2554/4041* (2020.02)

(58) Field of Classification Search
CPC .. B60W 30/09; B60W 10/18; B60W 30/0956; B60W 40/08; B60W 50/14; B60W 2554/4041; B60W 2540/225
See application file for complete search history.

(56) References Cited

U.S. PATENT DOCUMENTS

| 11,661,075 | B2 * | 5/2023 | Julian | B60W 50/14 340/439 |
| 11,993,277 | B2 * | 5/2024 | Julian | G06V 20/597 |
| 2016/0332571 | A1 * | 11/2016 | Yokoi | B60T 8/17558 |
| 2020/0001839 | A1 * | 1/2020 | Lee | B60T 8/17558 |
| 2020/0265242 | A1 * | 8/2020 | Funahara | G06V 20/56 |
| 2022/0144303 | A1 * | 5/2022 | Agarwal | B60W 30/095 |
| 2022/0219610 | A1 * | 7/2022 | Solar | H04N 21/4788 |
| 2022/0289176 | A1 * | 9/2022 | Baek | B60W 10/06 |
| 2023/0406343 | A1 * | 12/2023 | Oman | B60W 40/072 |

* cited by examiner

Primary Examiner — Peter D Nolan
Assistant Examiner — Mikko Okechukwu Obioha
(74) Attorney, Agent, or Firm — Morgan, Lewis & Bockius LLP

(57) ABSTRACT

The present disclosure relates to an apparatus and method for controlling a brake system based on a driver's forward gaze.

10 Claims, 7 Drawing Sheets

APPARATUS AND METHOD FOR CONTROLLING BRAKE SYSTEM BASED ON DRIVER'S FORWARD GAZE

CROSS-REFERENCE TO RELATED APPLICATIONS

This application is based on, and claims priority from, Korean Patent Application Number 10-2021-0102317, filed Aug. 4, 2021, the disclosure of which is incorporated by reference herein in its entirety.

TECHNICAL FIELD

The present disclosure relates to an apparatus and method for controlling a brake system based on a driver's forward gaze.

BACKGROUND

The description in this section merely provides background information related to the present disclosure and does not necessarily constitute the related art.

As a part of autonomous driving technology, Forward Collision-Avoidance Assist (FCA) technology is being studied. The FCA technology is a technology for preventing a collision between a vehicle driving on a road and a front object. FCA means that when it is determined that a collision risk between a driving vehicle and a front object is equal to or greater than a preset threshold, an FCA system controls a brake system included in a vehicle by itself. Specifically, the FCA system avoids or reduces the collision risk between a vehicle and a front object by automatically assisting the braking force input by a driver to a brake system or braking the vehicle even without the driver's intervention. The FCA system uses at least one sensor included in a vehicle to calculate the relative position and relative velocity of a front object with respect to a driving vehicle, and determines a collision risk based thereon.

FIG. 1 is a flowchart for explaining an operation process of a conventional apparatus for controlling a brake system.

Referring to FIG. 1, the conventional apparatus for controlling a brake system extracts a driving trajectory based on a current driving state of a vehicle (S100).

When the apparatus for controlling the brake system determines that a front object exists, it is determined whether there is a collision risk between a vehicle and the front object using a sensor (S120). The case in which there is a risk that the front object will collide with the vehicle is when the front object exists within a driving trajectory or when the front object is predicted to enter the driving trajectory within a preset time.

When the apparatus for controlling the brake system determines that there is a risk of a front object colliding with a vehicle, the apparatus for controlling the brake system warns a driver of the collision risk (S140).

When the apparatus for controlling the brake system determines that there is a risk of a front object colliding with a vehicle, the apparatus for controlling the brake system decides to intervene in braking, and automatically intervenes in braking for the brake system of the vehicle or assists in a braking process performed by a driver (S160).

FIG. 2A and FIG. 2B are exemplary diagrams for explaining a method for a conventional apparatus for controlling a brake system to determine whether there is a collision risk between a vehicle and a front object within a driving trajectory.

Referring to FIG. 2A and FIG. 2B, the apparatus for controlling the brake system determines a collision risk between a vehicle 200 and a front object using only a driving trajectory 202 without considering road information. The facilities installed on a road include a road sign, a curb, a guardrail, and the like. Road information is a mark indicated for traffic safety, and includes a centerline, a lane, a route change restriction line, and a road edge zone line. In the case of a road with a large change in curvature, the mismatch between the area of the driving trajectory 202 and the area in which at least one sensor included in the vehicle senses the front of the vehicle is deepened. Accordingly, even when the front object exists in front of the vehicle, a conventional apparatus for controlling a brake system unnecessarily warns a driver of the collision risk and intervenes in braking for the brake system included in the vehicle when the front object does not exist on the driving trajectory.

When a driver does not gaze forward, the vehicle 200 may deviate from a left lane 204 or a right lane 206 due to the driver's carelessness. On the other hand, when the driver gazes forward, the driver may recognize information on a road. As illustrated in FIG. 2A, when a pedestrian 210 is on a sidewalk 208, the driver may recognize the presence of the pedestrian 210. As illustrated in FIG. 2B, when a front vehicle 214 is stopped on a shoulder 212, the driver may recognize the front vehicle 214.

However, according to this related art, despite the situation in which a driver may recognize information on a road by gazing forward, a conventional apparatus for controlling a brake system unnecessarily warns a driver of the collision risk between a vehicle and a front object and intervenes in braking for the brake system included in the vehicle.

SUMMARY

According to at least one embodiment, the present disclosure provides an apparatus for controlling a brake system present in a vehicle based on a forward gaze, the apparatus comprising: a data collection unit which uses at least one sensor to collect information on road facility located in front of the vehicle and information on front object located in front of the vehicle; a forward gaze determination unit which determines whether a driver gazes forward; a driving trajectory extraction unit which uses driving information collected from a communication circuit of the vehicle to extract a driving trajectory of the vehicle; a road boundary recognition unit which uses at least one of the road facility information and road information collected by a GPS device to recognize a road boundary; a limited trajectory generation unit which generates a limited trajectory in which the driving trajectory is limited based on the road boundary; a collision risk determination unit which determines whether there is a risk that the front object will collide with the vehicle based on the limited trajectory when the forward gaze determination unit determines that the driver gazes forward; and a braking intervention determination unit which determines whether to intervene in braking for the brake system based on a result determined by the collision risk determination unit.

According to other embodiment, the present disclosure provides a method for controlling a brake system present in a vehicle based on a forward gaze, the method comprising: collecting, by at least one sensor, information on road facility located in front of the vehicle and information on front object located in front of the vehicle; determining, by a forward gaze determination unit, whether a driver gazes forward; extracting, by a driving trajectory extraction unit, a driving trajectory of the vehicle using driving information collected from a communication circuit of the vehicle; recognizing, by a road boundary recognition unit, a road boundary using at least one of the road facility information and road information collected by a GPS device; generating, by a limited trajectory generation unit, a limited trajectory in which the driving trajectory is limited based on the road boundary; determining, by a collision risk determination unit, whether there is a risk that the front object will collide with the vehicle based on the limited trajectory when the forward gaze determination unit determines that the driver gazes forward; and determining, by a braking intervention determination unit, whether to intervene in braking for the brake system based on a result of the determining of whether there is the risk that the front object will collide with the vehicle based on the limited trajectory.

REFERENCE NUMERALS

Figure 1:
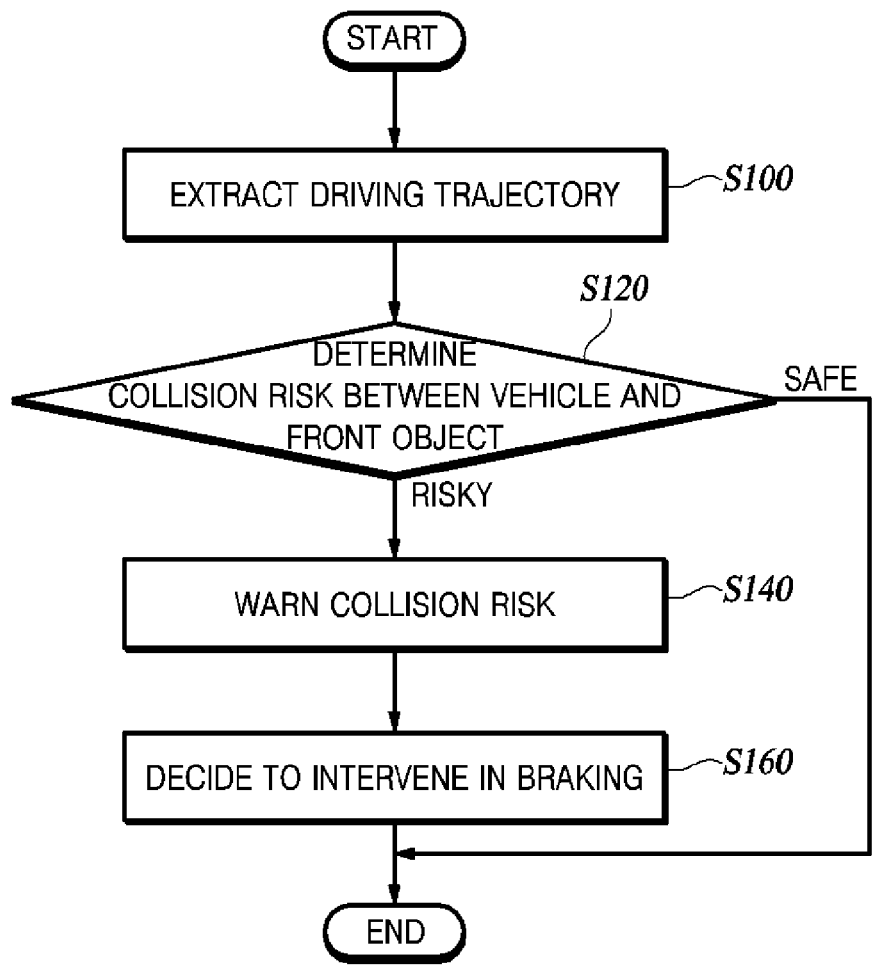
FIG. 1 is a flowchart for explaining an operation process of a conventional apparatus for controlling a brake system.
Figure 2A:
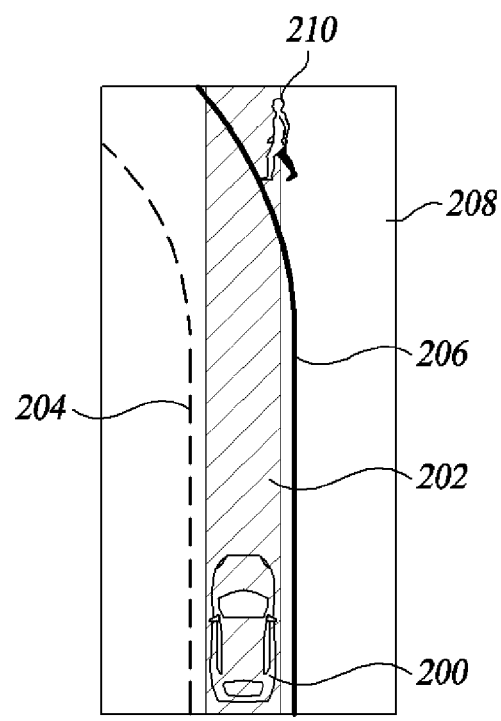
FIG. 2A and FIG. 2B are exemplary diagrams for explaining a method for a conventional apparatus for controlling a brake system to determine whether there is a collision risk between a vehicle and a front object within a driving trajectory.
Figure 2B:
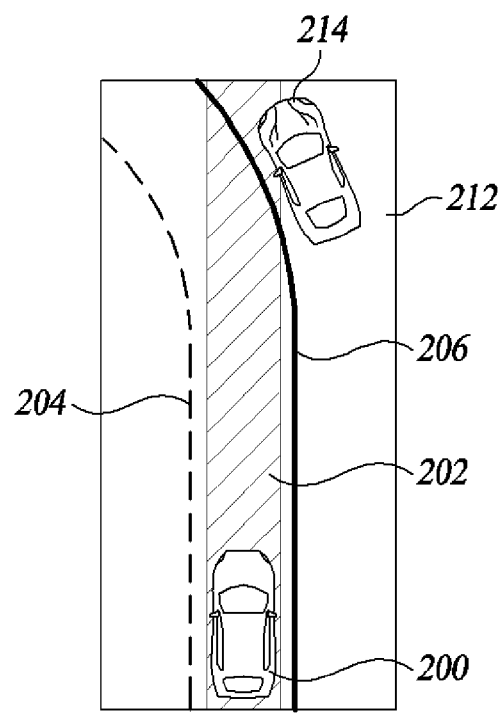

300: APPARATUS FOR CONTROLLING BRAKE SYSTEM BASED ON FORWARD GAZE
302: DATA COLLECTION UNIT
304: DRIVING TRAJECTORY EXTRACTION UNIT
306: FORWARD GAZE DETERMINATION UNIT
308: ROAD BOUNDARY RECOGNITION UNIT
310: LIMITED TRAJECTORY GENERATION UNIT
312: COLLISION RISK DETERMINATION UNIT
314: BRAKING INTERVENTION DETERMINATION UNIT

DETAILED DESCRIPTION

When it is determined that a driver is gazing forward, an apparatus for controlling a brake system based on a forward gaze according to an embodiment may limit a driving trajectory based on information on a road.

When it is determined that the driver is gazing forward, the apparatus for controlling the brake system based on the forward gaze according to an embodiment determines the collision risk between a vehicle and a front object based on the limited driving trajectory, warns the driver, and directly intervenes in braking.

The aspects of the present disclosure are not limited to the foregoing, and other aspects not mentioned herein will be able to be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or sequence of the components. Throughout this specification, when parts "include" or "comprise" a component, they are meant to further include other components, not to exclude thereof unless there is a particular description contrary thereto.

Figure 3:
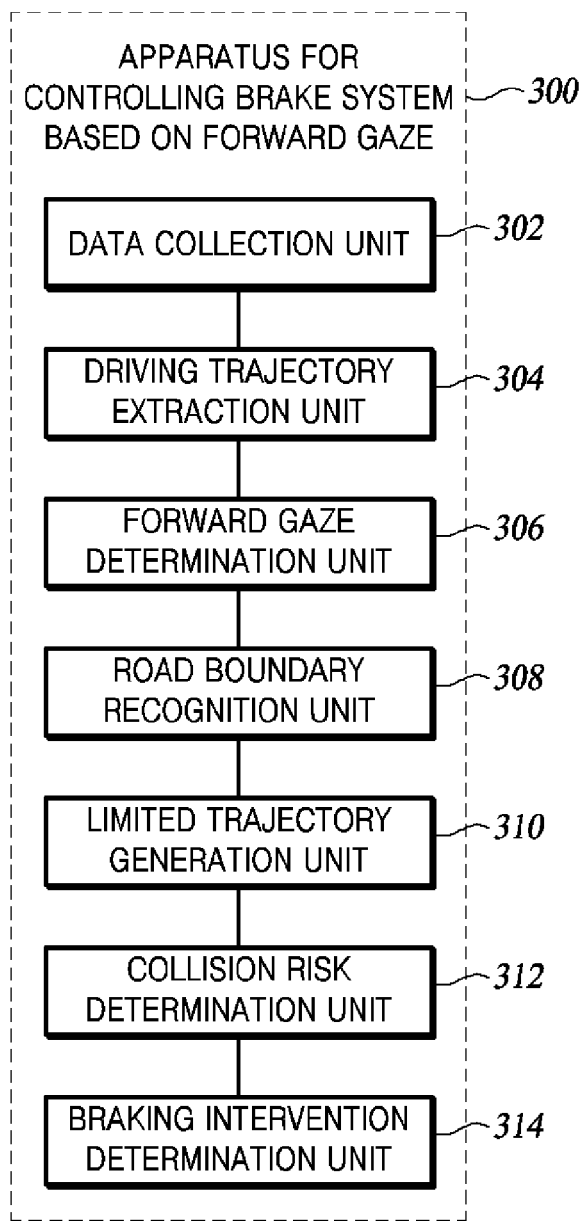
FIG. 3 is a view for explaining the configuration of an apparatus for controlling a brake system based on a forward gaze according to an embodiment of the present disclosure.

FIG. 3 is a view for explaining the configuration of an apparatus for controlling a brake system based on a forward gaze according to an embodiment of the present disclosure.

Referring to FIG. 3, the apparatus for controlling the brake system based on the forward gaze includes all or part of a data collection unit 302, a driving trajectory extraction unit 304, a forward gaze determination unit 306, a road boundary recognition unit 308, a limited trajectory generation unit 310, a collision risk determination unit 312, and a braking intervention determination unit 314.

The data collection unit 302 uses at least one sensor to collect information on a road facility located in front of a vehicle (hereinafter, "road facility information") and information on a front object located in front of the vehicle (hereinafter, "front object information"). Here, the at least one sensor includes a camera, an ultrasonic sensor, a radio detection and ranging (RADAR) sensor, and a light detection and ranging (LIDAR) sensor included in the vehicle. Since the technology for collecting road facility information and front object information is common in the field of autonomous driving technology, a detailed description thereof will be omitted.

A method in which the data collection unit 302 collects road facility information and front object information may use a sensor fusion technology. Sensor fusion technology is a technology for physically combining a plurality of sensors and synthesizing data collected from each sensor. The data collection unit 302 transmits the road facility information collected using the sensor fusion technology to the road boundary recognition unit 308. The data collection unit 302 transmits the front object information collected using the sensor fusion technology to the collision risk determination unit 312.

The driving trajectory extraction unit 304 extracts a driving trajectory based on information on the current driving state of a vehicle (hereinafter, "driving state information"). The driving state information includes a vehicle speed, a steering angle, and a steering angular speed. The driving trajectory extraction unit 304 receives driving state information using a communication system included in the vehicle. As a communication system included in a vehicle, a Controller Area Network (CAN) communication system is typically used. However, the communication system is not limited to the CAN communication system, and any protocol for communication between various electronic devices mounted on the vehicle may be used. Local Interconnect Network (LIN) communication is communication between an actuator and smart sensors in an automobile network. The LIN communication is used to implement power windows and seat controls.

The driving trajectory means a trajectory in which a vehicle is expected to drive within a preset time based on current driving state information. Specifically, when a vehicle speed increases, the distance that the vehicle drives within a preset time increases, and thus the length of the traveling trajectory increases. In the case of a road with a large change in curvature, the curvature of the driving trajectory also changes according to the steering angle of the vehicle.

The forward gaze determination unit 306 recognizes a driver using at least one sensor included in a vehicle, and determines whether the recognized driver gazes forward. Specifically, the forward gaze determination unit 306 determines whether the driver is gazing forward using a Driver State Monitoring (DSM) technology. The DSM technology recognizes the driver using a camera and senses the driver's state based on the recognized driver's eye blinking and gaze direction. Here, the driver's state means the driver's posture, the driver's fatigue level, and whether the driver is gazing forward.

The road boundary recognition unit 308 recognizes a road boundary using the road facility information collected by the data collection unit 302 and the road information collected by a GPS device. The GPS device may collect road information, such as the lane of the road in which a vehicle is driving, based on a high-definition map (HD map). The road boundary may be road facilities and lanes installed for vehicles to safely drive. The road boundary includes a curb, a guard rail, and a lane of a road in which a vehicle is currently driving, and may exist in the vicinity of a driving trajectory.

The limited trajectory generation unit 310 generates a limited trajectory so that the driving trajectory does not deviate from the road boundary. The limited trajectory is a part of the driving trajectory that exists inside the road boundary.

The collision risk determination unit 312 determines whether a collision between a vehicle and a front object is expected based on the front object information collected by the data collection unit 302. The determination method of the collision risk determination unit 312 determines whether there is a collision risk between the vehicle and the front object by using the relative position and relative velocity between the vehicle and the front object. When the forward gaze determination unit 306 determines that a driver is gazing forward, the collision risk determination unit 312 determines whether a collision between the vehicle and the front object is expected within the limited trajectory. When the front object exists within the limited trajectory or is predicted to exist within the limited trajectory within a preset time, the collision risk determination unit 312 determines that there is a collision risk between the vehicle and the front object. When the forward gaze determination unit 306 determines that the driver is not gazing forward, the collision risk determination unit 312 determines whether a collision between the vehicle and the front object is expected within the driving trajectory. When the front object exists within the driving trajectory or is predicted to exist within the driving trajectory within a preset time, the collision risk determination unit 312 determines that there is a collision risk between the vehicle and the front object.

The braking intervention determination unit 314 determines whether to intervene in braking for a brake system of a vehicle based on a result determined by the collision risk determination unit 312. When the collision risk determination unit 312 determines that there is a collision risk between a vehicle and a front object, the braking intervention determination unit 314 may determine to intervene in braking for the brake system.

When the collision risk determination unit 312 determines that there is a collision risk between a vehicle and a front object, a warning unit (not shown) warns a driver that there is a collision risk between the vehicle and the front object. Methods for the warning unit to warn the driver include a display, a haptic device, and an acoustic device. The method using the display generates a visual output to provide a warning message to the driver or passengers. The display mounted on the vehicle includes a Center Infotainment Display (CID), a cluster, a Rear Seat Entertainment (RSE), and a Head Up Display (HUD). The CID communicates with navigation, mobile and audio systems to provide vehicle driving information and entertainment. The cluster provides information necessary for driving, such as the vehicle's driving speed, RPM, fuel amount, and collision warning. The RSE is a display mainly used for entertainment activities for passengers in the back seat of a vehicle, and also provides a driving state of a vehicle or a simple navigation information. The HUD projects the vehicle's current speed, fuel level, and navigation information as graphic images on the driver's windshield. However, the display is not limited thereto, and may include a device capable of providing visual information to a driver or passengers.

The method of using a haptic device provides information by generating a tactile output to a driver. As used herein, haptic refers to a computer tactile technology that allows a user to feel tactile information by using vibration or shock in a digital device. The haptic device includes devices mounted on a car seat and a steering wheel. However, the haptic device is not limited thereto, and may include a device that a driver contacts while driving a vehicle.

An acoustic device is a device that transmits information by generating an auditory output to a driver and passengers. The acoustic device includes an audio device mounted on a vehicle.

When the braking intervention determination unit 314 decides to directly intervene in braking, an alarm unit (not shown) notifies a driver that braking for the brake system is to be performed. Specifically, when an apparatus 300 for controlling a brake system based on a forward gaze determines that the driver is gazing forward and decides to intervene in braking within the limited trajectory, the alarm unit notifies that the control for the brake system is to be performed based on the driver's forward gaze. When the apparatus 300 for controlling the brake system based on the forward gaze determines that the driver is not gazing forward and decides to intervene in braking within the driving trajectory, the alarm unit notifies that the control using a conventional FCA system is to be performed. Since the method in which the alarm unit notifies the driver is the same as the method in which the warning unit gives a warning to the driver, a detailed description thereof will be omitted.

Figure 4:
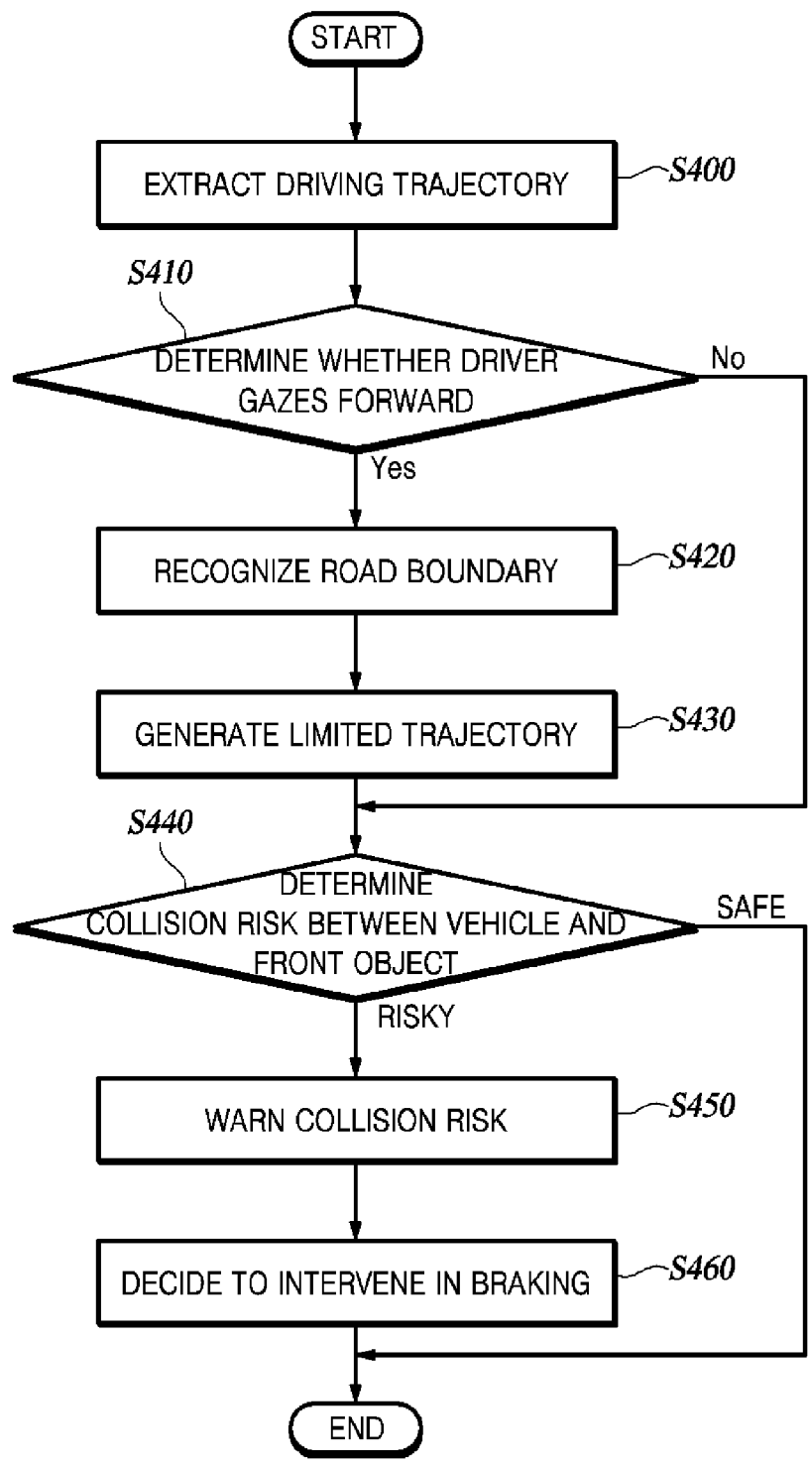
FIG. 4 is a flowchart for explaining an operation process of an apparatus for controlling a brake system based on a forward gaze according to an embodiment of the present disclosure.

FIG. 4 is a flowchart for explaining an operation process of an apparatus for controlling a brake system based on a forward gaze according to an embodiment of the present disclosure.

Referring to FIG. 4, the driving trajectory extraction unit 304 extracts a driving trajectory based on the driving state information of a vehicle received from a communication circuit of the vehicle (S400).

The forward gaze determination unit 306 recognizes a driver using at least one sensor included in a vehicle, and determines whether the driver is gazing forward using a DSM technology based on the recognized driver information (S410).

When it is determined that the driver is gazing forward as a result of the determination of the forward gaze determination unit 306, the road boundary recognition unit 308 recognizes a road boundary existing in the vicinity of a driving trajectory using the road facility information collected by the data collection unit 302 and/or the road information collected by a GPS device.

The limited trajectory generation unit 310 generates a limited trajectory (S430).

Using the front object information collected by the data collection unit 302, the collision risk determination unit 312 determines whether there is a collision risk between a vehicle and a front object (S440). When a driver gazes forward, the collision risk determination unit 312 determines whether there is a collision risk between the vehicle and the front object based on a limited trajectory. When the driver does not gaze forward, the collision risk determination unit 312 determines whether there is a collision risk between the vehicle and the front object based on a driving trajectory.

When the collision risk determination unit 312 determines that there is a collision risk between a vehicle and a front object, the warning unit (not shown) warns a driver that there is a collision risk between the vehicle and the front object (S450).

When the collision risk determination unit 312 determines that there is a collision risk between a vehicle and a front object, the braking intervention determination unit 314 decides to intervene in braking for a brake system (S460).

When the braking intervention determination unit 314 decides to intervene in braking for a brake system, the alarm unit (not shown) notifies a driver of braking intervention (not shown).

Although each process in FIG. 4 is described to be sequentially performed, they merely instantiate the technical idea of some embodiments of the present disclosure. Therefore, a person having ordinary skill in the technical field to which some embodiments of the present disclosure pertain could incorporate various modifications and substitutions in practicing the present disclosure by changing the process described by FIG. 4 or by performing one or more of the processes in parallel, without departing from the essential characteristics of some embodiments of the present disclosure; accordingly, the processes in FIG. 4 are not limited to a time-series order.

Figure 5A:
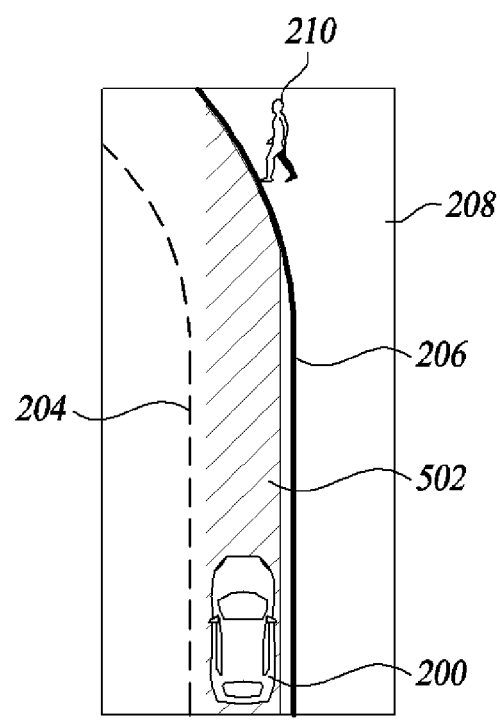
FIG. 5A and FIG. 5B are exemplary diagrams for explaining an embodiment in which the apparatus for controlling the brake system based on the forward gaze determines whether there is a collision risk between a vehicle and a front object within a limited trajectory according to an embodiment of the present disclosure.
Figure 5B:
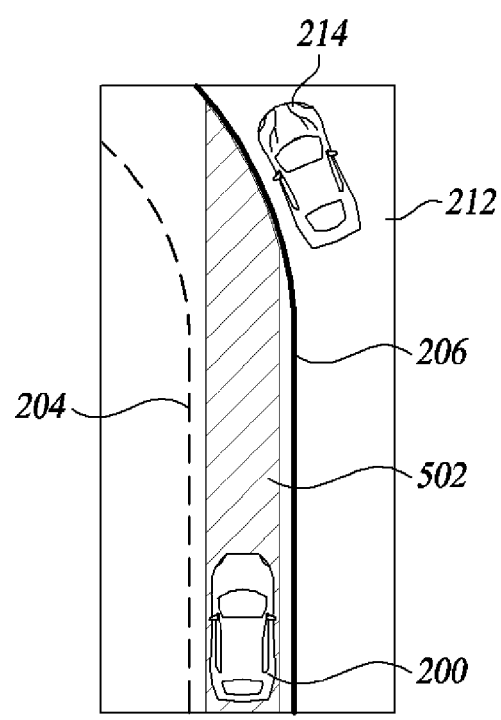

FIG. 5A and FIG. 5B are exemplary diagrams for explaining an embodiment in which the apparatus for controlling the brake system based on the forward gaze determines whether there is a collision risk between a vehicle and a front object within a limited trajectory according to an embodiment of the present disclosure.

Referring to FIG. 5A, when the pedestrian 210 is on the sidewalk 208, a conventional apparatus for controlling a brake system does not consider road information, and thus determines whether there is a collision risk between the vehicle 200 and the pedestrian 210 based only on the driving trajectory 202. In spite of a situation in which there is no collision risk between the vehicle 200 and the pedestrian 210 by the driver gazing forward, the conventional apparatus for controlling the brake system unnecessarily intervenes in braking. However, when it is determined that the driver is gazing forward, the apparatus 300 for controlling the brake system based on the forward gaze according to an embodiment of the present disclosure considers both the driving trajectory 202 and the road information and determines whether there is a collision risk between the vehicle 200 and the pedestrian 210. The apparatus 300 for controlling the brake system based on the forward gaze may generate a portion of the driving trajectory 202 existing in the right region of the left lane 204 and the left region of the right lane 206 as the limited trajectory 502. Based on the generated limited trajectory 502, the apparatus 300 for controlling the brake system based on the forward gaze may prevent unnecessary braking intervention by determining whether there is a collision risk between the vehicle 200 and the pedestrian 210.

Referring to FIG. 5B, when the front vehicle 214 is stopped on the shoulder 212, because there is no collision risk between the vehicle 200 and the front vehicle 214 on the limited trajectory 502, the apparatus 300 for controlling the brake system based on the forward gaze does not intervene in braking for a brake system.

Various implementations of the apparatuses and methods described herein may be implemented by a programmable computer. The computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

According to an embodiment, when it is determined that a driver is gazing forward, the apparatus for controlling the brake system based on the forward gaze limits a driving trajectory based on a road boundary in consideration of road information. Accordingly, it is possible to address an issue that the mismatch between the area of the driving trajectory and the front area of a vehicle is deepened.

According to one embodiment, when it is determined that the driver is gazing forward, the apparatus for controlling the brake system based on the forward gaze determines the collision risk between a vehicle and a front object based on the limited driving trajectory, warns the driver, and directly intervenes in braking so that unnecessary warning and braking intervention can be reduced.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof

What is claimed is:

1. An apparatus for controlling a brake system present in a vehicle based on a forward gaze, the apparatus comprising:

a data collection unit which uses at least one sensor to collect information on road facility located in front of the vehicle and information on a front object located in front of the vehicle;

a forward gaze determination unit which determines whether a driver gazes forward;

a driving trajectory extraction unit which uses driving information collected from a communication circuit of the vehicle to extract a driving trajectory of the vehicle;

a road boundary recognition unit which uses at least one of the road facility information and road information collected by a GPS device to recognize a road boundary;

a limited trajectory generation unit which generates a limited trajectory of the vehicle in which the driving trajectory is limited based on the road boundary;

a collision risk determination unit which determines whether there is a risk that the front object will collide with the vehicle based on the limited trajectory when the forward gaze determination unit determines that the driver gazes forward; and a braking intervention determination unit which determines whether to intervene in braking for the brake system based on a result determined by the collision risk determination unit.

2. The apparatus of claim 1, further comprising a warning unit which warns the driver of a collision risk between the front object and the vehicle when the collision risk determination unit determines that the collision risk is present.

3. The apparatus of claim 1, further comprising an alarm unit which notifies that braking intervention for the brake system is to be performed when the braking intervention determination unit decides to intervene in the braking for the brake system.

4. The apparatus of claim 1, wherein when the front object exists within the limited trajectory or is predicted to exist within the limited trajectory within a preset time, the collision risk determination unit determines that there is a collision risk.

5. The apparatus of claim 1, wherein when the forward gaze determination unit determines that the driver is not gazing forward, the collision risk determination unit determines that there is a collision risk when the front object exists within the driving trajectory or is predicted to exist within the driving trajectory within a preset time based on the driving trajectory.

6. A method for controlling a brake system present in a vehicle based on a forward gaze, the method comprising:

collecting, by at least one sensor, information on road facility located in front of the vehicle and information on a front object located in front of the vehicle;

determining, by a forward gaze determination unit, whether a driver gazes forward;

extracting, by a driving trajectory extraction unit, a driving trajectory of the vehicle using driving information collected from a communication circuit of the vehicle;

recognizing, by a road boundary recognition unit, a road boundary using at least one of the road facility information and road information collected by a GPS device;

generating, by a limited trajectory generation unit, a limited trajectory of the vehicle in which the driving trajectory is limited based on the road boundary;

determining, by a collision risk determination unit, whether there is a risk that the front object will collide with the vehicle based on the limited trajectory when the forward gaze determination unit determines that the driver gazes forward; and determining, by a braking intervention determination unit, whether to intervene in braking for the brake system based on a result of the determining of whether there is the risk that the front object will collide with the vehicle based on the limited trajectory.

7. The method of claim 6, further comprising warning, by a warning unit, the driver of a collision risk between the front object and the vehicle when the collision risk determination unit determines that the collision risk is present.

8. The method of claim 6, further comprising notifying, by an alarm unit, that braking intervention for the brake system is to be performed when the braking intervention determination unit decides to intervene in the braking for the brake system.

9. The method of claim 6, wherein the determining of whether there is the risk that the front object will collide with the vehicle based on the limited trajectory includes determining, by the collision risk determination unit, a collision risk when the front object exists within the limited trajectory or is predicted to exist within the limited trajectory within a preset time.

10. The method of claim 6, wherein when the forward gaze determination unit determines that the driver is not gazing forward, the method further includes determining, by the collision risk determination unit, that there is a collision risk when the front object exists within the driving trajectory or is predicted to exist within the driving trajectory within a preset time based on the driving trajectory.

* * * * *